United States Patent
Nagashima et al.

Patent Number: 6,051,664
Date of Patent: *Apr. 18, 2000

[54] THERMOPLASTIC RESIN COMPOSITION AND ITS MOLDED ARTICLE

[75] Inventors: Tohru Nagashima; Hideo Nomura, both of Ibaraki, Japan

[73] Assignee: Sumitomo Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/878,095

[22] Filed: Jun. 18, 1997

[30] Foreign Application Priority Data

Jun. 18, 1996 [JP] Japan ..................... 8-156522

[51] Int. Cl.⁷ .............. C08L 67/03; C08L 67/04
[52] U.S. Cl. .............. 525/444; 525/437; 525/450
[58] Field of Search .................... 525/444, 437

[56] References Cited

U.S. PATENT DOCUMENTS

| | | | |
|---|---|---|---|
| 4,414,365 | 11/1983 | Sugimoto | 525/444 |
| 4,837,268 | 6/1989 | Matsumoto | 525/444 |
| 5,091,464 | 2/1992 | Huspeni et al. | |
| 5,216,092 | 6/1993 | Huspeni | 525/444 |
| 5,492,946 | 2/1996 | Huspeni et al. | |
| 5,514,739 | 5/1996 | Aketa | 525/444 |

FOREIGN PATENT DOCUMENTS

| | | |
|---|---|---|
| 1-69947A1 | 2/1986 | European Pat. Off. |
| 2-61869A2 | 3/1988 | European Pat. Off. |
| 3-74716A2 | 6/1990 | European Pat. Off. |
| 4-76615A2 | 7/1990 | European Pat. Off. |
| 5-69001A1 | 11/1993 | European Pat. Off. |

OTHER PUBLICATIONS

Patent Abstracts of Japan, vol. 15, No. 202 (C–0834) (JP 03 054250 A) (Mar. 8, 1991) abstract.

Patent Abstracts of Japan, vol. 96, No. 4, (JP 07 331036 A) (Dec. 19, 1995) abstract.

*Primary Examiner*—Patricia A. Short
*Attorney, Agent, or Firm*—Birch, Stewart, Kolasch & Birch, LLP

[57] ABSTRACT

A thermoplastic resin composition includes (a) 1 to 99% by weight of a liquid crystalline polyester and (b) 99 to 1% by weight of a polyester as indispensable components, wherein the polyester is composed of the repeating units represented by the following formulas I, II and III in a specific ratio,

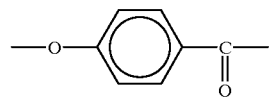

I

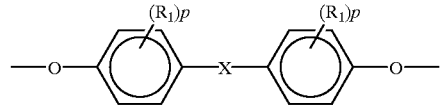

II

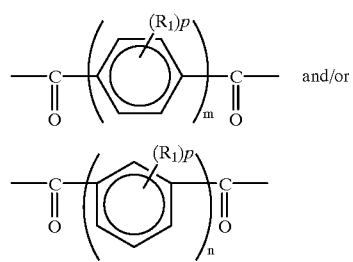

III wherein, X is $-SO_2-$, $-CO-$, $-O-$, $-S-$, $-CH_2-$, $-CH_2-CH_2-$, $-C(CH_3)_2-$, or a single bond; $R_1$ represents an alkyl group having 1 to 6 carbon atoms, an alkenyl group having 3 to 10 carbon atoms, a phenyl group, or a halogen atom; p is an integer of 0 to 4; m and n are integers of 1 to 4; a plurality of $R_1$ on the same or different nuclei may be the same or different, and each p may be the same or different.

4 Claims, No Drawings

THERMOPLASTIC RESIN COMPOSITION AND ITS MOLDED ARTICLE

BACKGROUND OF THE INVENTION

1. Field of the Invention

The present invention relates to a thermoplastic resin composition excellent in mechanical properties.

2. Description of the Related Art

A liquid crystalline polyester does not cause entanglement in a molten state because of the rigid molecular shape, forms a polydomain in a liquid crystal state, and exhibits a behavior in which the molecular chains orient remarkably in the flow direction by shearing at the time of molding, and is generally, called a liquid crystalline polymer (thermotropic liquid crystalline polymer).

For this specific behavior, a liquid crystalline polyester has an extremely excellent melt flowability. Depending on the structure, a liquid crystalline polyester has a high deflection temperature under load and a high enduring temperature (continuously usable temperature), such that neither deformation nor a blister is produced even in a molten soldering temperature of 260° C. or more.

From the above, a resin composition including a liquid crystalline polyester filled with a fibrous reinforcement such as a glass fiber, an inorganic filler such as talc, and a heat stabilizer etc., serves as a material suitable for electric and electronic parts having thin or complicated form, and used for relay parts, a coil bobbin, a connector, a sealing of relay coil and IC, volume parts, a commutator, motor parts, etc.

Blended compositions of various liquid crystalline polyesters and thermoplastic resins have been examined for the purpose of improvement of melt processability, mechanical strength, etc.

For example, JP-A-56-115357 discloses that melt viscosity falls down by blending of a liquid crystalline polyester and other thermoplastic resins, and processability of a thermoplastic resin is improved.

JP-A-57-40551 discloses that the composition having an excellent mechanical strength is obtained by blending a liquid crystalline polyester and polycarbonate.

However, since different resins are generally incompatible, a mixture obtained by simple melt-kneading thereof will form a crude phase separation structure having a disordered sea-island structure. Physical properties such as mechanical strength are not sufficient in many cases, and inconveniences for the above-mentioned use might occur.

SUMMARY OF THE INVENTION

An object of the present invention is to provide a high strength and a high heat resistant thermoplastic resin composition which can be used suitably for parts such as those in a car, and an airplane, an industrial instrument, a household electric appliances product, an OA instrument, electric and electronic parts, etc.

The inventors has made extensive studies for solving the above problems, and found out that the above object is attained by using a polyester having a specific structure as a resin to be formulated with a liquid crystalline polyester.

That is, the present invention is as follows.

[1] A thermoplastic resin composition comprising 1 to 99% by weight of a liquid crystalline polyester (a) and 99 to 1% by weight of a polyester (b) as indispensable components, wherein the polyester is composed of the repeating units represented by the following formulas I, II and III,

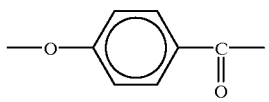

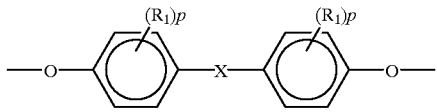

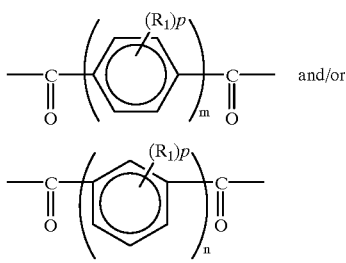

in the formula, X is —$SO_2$—, —CO—, —O—, —S—, —$CH_2$—, —$CH_2$—$CH_2$—, —$C(CH_3)_2$—, or a single bond; $R_1$ represents an alkyl group having 1 to 6 carbon atoms, an alkenyl group having 3 to 10 carbon atoms, a phenyl group, or a halogen atom; p is an integer of 0 to 4; m and n are integers of 1 to 4; a plurality of $R_1$ on the same or different nuclei may be different each other, and each p may be different each other, and the polyester satisfies the following expression:

$$0 \leq (I) \leq 95 (\text{mol }\%) \quad (II)+(III)=100-(I)(\text{mol }\%)$$

and $$0.9 \leq (II)/(III) \leq 1.1$$

[2] The thermoplastic resin composition according to [1], wherein X in the formula II of the polyester (b) is —$SO_2$— or —$C(CH_3)_2$—.

[3] The thermoplastic resin composition according to [1] or [2], wherein the liquid crystalline polyester (b) contains the repeating unit represented by the following formula (A1) at least 30 mol %.

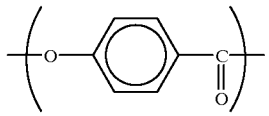

(A1)

[4] A molded article molded using the thermoplastic resin composition of [1], [2] or [3].

[5] The molded article according to [4], wherein the thermoplastic resin composition comprises 1 to 40% by weight of component (a) and 99 to 60% by weight of component (b) as indispensable components, and the component (a) is finely dispersed with a mean dispersion particle diameter of 1 micrometer or less in the molded article.

[6] The molded article according to [4], wherein the thermoplastic resin composition comprises 60 to 99% by weight of component (a) and 40 to 1% by weight of component (b) as indispensable components, and the component (b) is finely dispersed with a mean dispersion particle diameter of 1 micrometer or less in the molded article.

The liquid crystalline polyester used in the invention is generally called a thermotropic liquid crystalline polymer. Examples of the liquid crystalline polyester include:

(1) one produced from a combination of an aromatic dicarboxylic acid, an aromatic diol, an aromatic hydroxycarboxylic acid and/or an aminobenzoic acid, (2) one produced from two or more different aromatic hydroxycarboxylic acids, (3) one produced from an aromatic dicarboxylic acid and a nucleus substituted aromatic diol, and (4) one produced by reacting an aromatic hydroxycarboxylic acid or the like with a polyester such as polyethylene terephthalate These polymers form an anisotropy melt at a temperature of 400° C. or less. The aromatic dicarboxylic acid, the aromatic diol and the aromatic hydroxycarboxylic acid may be replaced by their ester forming derivatives.

Repeating units of the liquid crystalline polyester are illustrated as follows, but the liquid crystalline polyester is not limited to these.

Repeating units derived from aromatic hydroxycarboxylic acids:

(A1)

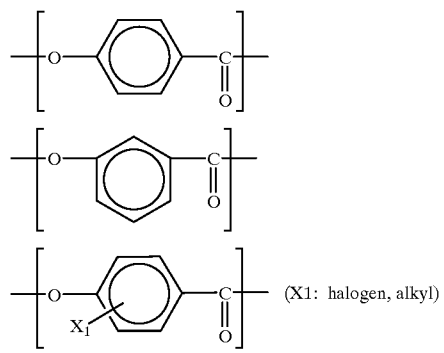

(X1: halogen, alkyl)

(A2)

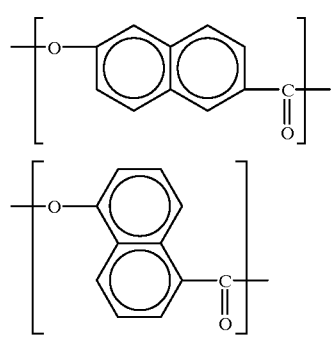

Repeating units derived from aromatic dicarboxylic acids:

(B1)

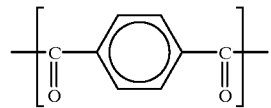

(B2)

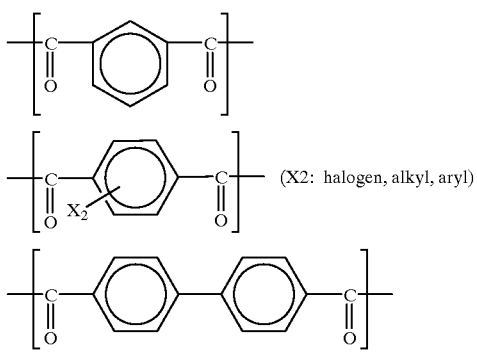

(X2: halogen, alkyl, aryl)

(B3)

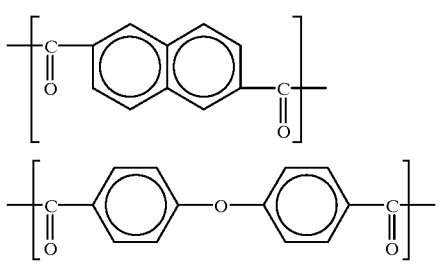

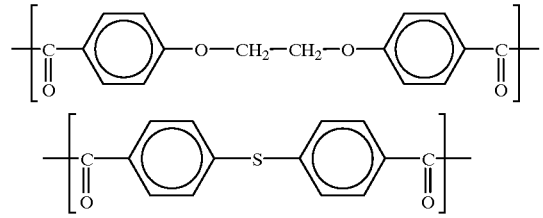

Repeating unit derived from aromatic diols:

(C1)

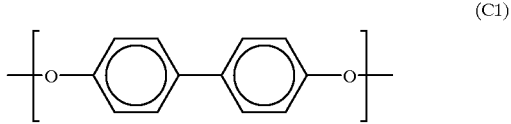

(C2)

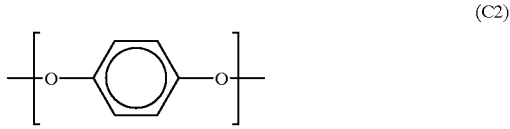

(C3)

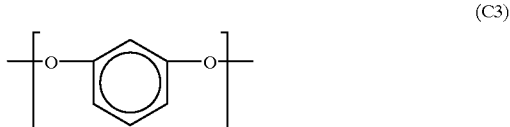

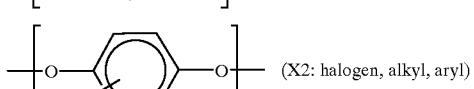

(X2: halogen, alkyl, aryl)

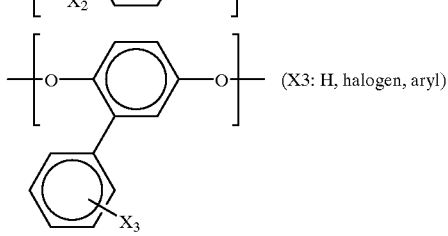

(X3: H, halogen, aryl)

-continued

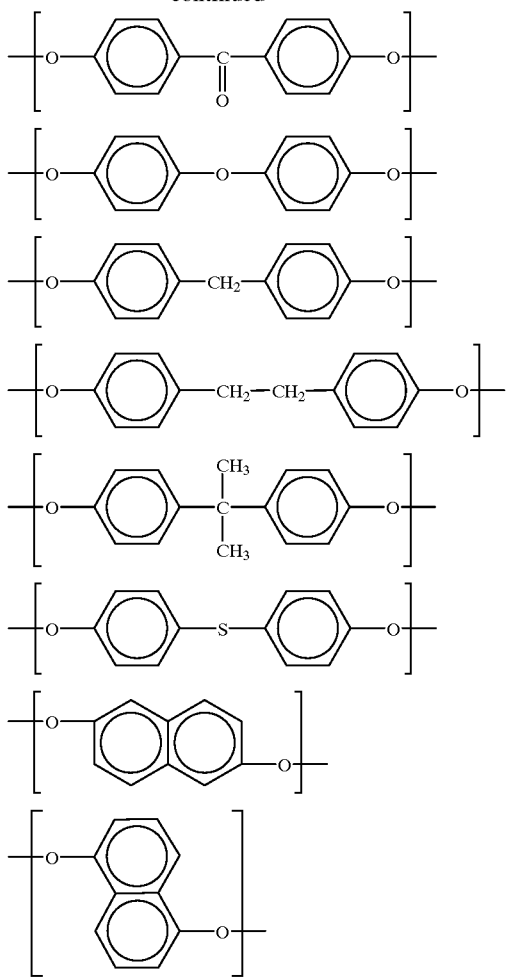

In view of a balance among the heat resistance, the mechanical properties and the processability, a liquid crystalline polyester preferably contains the repeating unit represented by the above formula (A1) at least 30 mol %.

Specifically, polyesters having a combination of repeating units shown below are preferred.

[a]: (A1), (B1) or the mixture of (B1) and (B2), and (C1)
[b]: (A1), and (A2)
[c]: a combination wherein a part of (A1) is replaced by (A2) in the combination [a]
[d]: a combination wherein a part of (B1) is replaced by (B3) in the combination [a]
[e]: a combination wherein a part of (C1) is replaced by (C3) in the combination [a]
[f]: a combination wherein (B1) and (C2) are further added to the combination [b]

The flow temperature of these liquid crystalline polyesters measured by the following method is preferably from 200° C. to 400° C., and more preferably from 250° C. to 350° C.

When the flow temperature exceeds 400° C., the moldabilty becomes worse, and when the flow temperature is 250° C. or less, the heat resistance is insufficient.

Liquid crystalline polyesters containing above [a] and [b] as a basic structure are described, for example, in JP-B-47-47870, JP-B-63-3888, etc.

The polyester (b) having the specific structure consists of the repeating units represented by the above formulas I, II, and III, and satisfies the above-mentioned expression. The repeating unit represented by formula II may be 2 or more sorts of mixtures wherein x is different each other in the formula.

The polyester having the repeating unit represented by formula I in an amount of 95 mol % or more, has many crystal portions not meltable. And the polyester and a thermoplastic resin cannot be dispersed during the production of a composition, it is not preferred.

In case of (II)/(III) <0.9 or (II)/(III)> 1.1 in the polyester, a sufficiently high molecular weight product can not be obtained at the time of the production of polyester, and it is not preferred.

Among the repeating units represented by formula II, the unit whose X is —$SO_2$— or —$C(CH_3)_2$— is preferred.

Moreover, as for the repeating unit represented by formula I, it is preferred that satisfies $0 \leq (I) \leq 80$ (mol %).

Examples of the method for producing the polyester (b) containing the specific structure used in this invention include:

a method which polymerizes the bisphenol component dissolved in an aqueous alkaline solution and terephthloyl chloride and/or isophthloyl chloride and parahydroxybenzoyl chloride dissolved in an organic solvent in the existence of a catalyst, a method which polymerizes acetylated bisphenol component, and terephthalic acid and/or isophthalic acid and parahydroxybenzic acid, with eliminating acetic acid at a high temperature, a method which polymerize phenyl ester of a bisphenol component, parahydroxybenzoic acid phenyl ester and phenyl ester of terephthalic acid and/or isophthalic acid with eliminating phenol at a high temperature, a method which polymerize the polyester obtained by the above-methods further in a solid phase, The production method is not limited to these.

The flow temperature of the polyester measured by the method shown below is preferably from 150° C. to 450° C., and more preferably from 280° C. to 400° C. When a polyester whose flow temperature is lower than 150° C. is formulated, heat deterioration is caused during the manufacture of a composition or during the mold processing of the obtained composition owing to the low molecular weight of the polyester, and it is not preferred.

When a polyester whose flow temperature exceeds 450° C. is formulated, the polyester and a thermoplastic resin do not disperse during the production of a composition owing to the high melt viscosity of the polyester, and it is not preferred.

The amount of the polyester having specific structure used in this invention is 1 to 99% by weight on the basis of the total weight of a liquid crystalline polyester and the polyester.

When the amount is less than 1% by weight, improvement in physical properties is not attained.

Moreover, when the amount is more than 99% by weight, the characteristics of a liquid crystalline polyester are spoiled greatly, and it is not preferred.

When the polyester is formulated for the purpose of improving an anisotropy of the molded article of a liquid crystalline polyester, the amount of formulations is preferably from 3 to 70% by weight, and more preferably from 5 to 50% by weight.

The method for producing the molded article using the thermoplastic resin composition of this invention is not especially limited. Examples of the molding method containing a process of melting, shaping and solidifying the resin include an extrusion molding, an injection molding, a blow molding. Among them, an injection molding is used preferably.

Molded articles obtained by extrusion molding can be processed further by cutting or pressing.

The mean dispersion particle diameter of the component (a) or (b) in the molded article using the thermoplastic resin composition of this invention is preferably 1 micrometer or less, and more preferably 0.5 micrometers or less. When the mean dispersion particle diameter is 1 micrometer or more, drawbacks such as lowering of the strength of a molded article occur, it is not preferred.

As a method of measuring a mean dispersion particle diameter, the picture analysis of a transmission electron microscope photograph of a molded article is generally used, but it is not limited to this.

In the thermoplastic resin composition of the present invention, 1 or more sorts of fibrous or needlelike reinforcements such as glass fiber, silica alumina fiber, alumina fiber, carbon fiber, aluminum borate whisker, etc., inorganic fillers such as talc, mica, clay, and glass beads, release modifiers such as a fluoropolymer and metallic soap, colorants such as a dye and a pigment, usual additives such as an antioxidant, a heat stabilizer, a ultraviolet absorber, an antistatic agent, a surfactant, etc. can be added.

Moreover, a small amount of 1 or more sorts of thermoplastic resins such as polyethylene, polypropylene, polyvinyl chloride, ABS resin, polystylene, methacrylic resin, etc., thermosetting resins such as a phenol resin, an epoxy resin, a cyanate resin, an isocyanate resin, a polyimide resin, and a rubber component, can also be added if necessary.

The formulation method of the raw materials for obtaining the resin composition of the present invention is not especially limited.

A liquid crystalline polyester (a), a polyester (b) having the above-mentioned specific structure, and if necessary, reinforcements such as a glass fiber, an inorganic filler, a release modifier, and a heat stabilizer are mixed using a Henschel mixer or a tumbling mixer, etc., and melt-kneaded using an extruder.

As the melt-kneading method, all raw materials can be mixed together for feeding to an extruder.

Raw materials such as reinforcements like a glass fiber and an inorganic filler can be also fed to an extruder separately from the raw materials mainly consisting of resins, if needed.

The thermoplastic resin composition of this invention can be used suitably for parts of a car and an airplane, an industrial instrument, a household electric appliances product, an OA instrument, electric and electronic parts, etc.

EXAMPLES

Hereafter, although the examples of this invention are shown, this invention is not limited to these.

In the examples, the tensile strength, yield elongation, flexural modulus, and flow temperature are measured as follows.

(1) Tensile Strength, Yield Elongation:

ASTM dumbbell specimen of No. 4 is molded from the thermoplastic resin composition of this invention using an injection molding machine, and measured according to ASTM D638.

(2) Flexural Modulus:

A specimen with length of 127 mm, width of 12.7 mm, and thickness of 6.4 mm from the thermoplastic resin composition of this invention, using an injection molding machine, and measured according to ASTMD790.

(3) Flow Temperature:

It is measured using Shimadzu Corporation Koka type flow tester CFT-500 type.

Flow temperature is defined as the temperature at which the melt viscosity of the resin shows 48000 poises, where the resin is extruded from a nozzle having an inner diameter of 1 mm and a length of 10 mm under 100 kg/cm$^2$ load, with heating by the temperature rising rate of 4° C. /min.

A resin having a lower flow temperature is excellent in flowability.

(4) Transmission Electron Microscope Observation:

From the molded article of the thermoplastic resin composition obtained by injection molding, a sliced piece is cut out by a microtome.

The transmission image is observed by 30 kV of acceleration voltage and 10000 times of the magnification with a super-high resolution scanning electron microscope (S-900 type, product of Hitachi Co., Ltd.).

The mean dispersion particle diameter is measured with a picture analysis device (LA-555 type, product of PIAS Co., Ltd.).

Referential Example 1

Parahydroxybenzoic acid, 4,4'-dihydroxydiphenylsulfone and terephthalic acid were charged into the polymerization vessel equipped with an anchor-type stirring blade by the molar ratio of 60:20:20.

After adding acetic anhydride of 1.1 equivalent amount to the hydroxy group, the mixture was stirred for 10 minutes, with substituting the inner atmosphere of the vessel by nitrogen.

Then, the reaction temperature was raised to 150° C. with stirring under nitrogen atmosphere, and after 3 hours of acetylation reaction, the temperature was raised to 320° C. in a rate of 1° C./min. while distilling off the acetic acid formed as a by-product.

The polycondensation was conducted for 15 minutes at 320° C.

After taking out the obtained polymer from the polymeization vessel and cooling, the polymer was pulverized to particles of a mean particle diameter of 1 mm or less with a grinder (Rotoplex R 16/8, product of Hosokawa Micron Co., Ltd.).

Furthermore, solid phase polymerization was conducted for 4 hours at a temperature of 260° C. under normal-pressure nitrogen atmosphere, and polyester 1 was obtained.

The flow temperature of this polyester was 355° C.

Referential Example 2

A polymer was obtained in the same manner as referential example 1 except that the solid phase polymerization was conducted for 4 hours at a temperature of 230° C. under normal-pressure nitrogen atmosphere, and polyester 2 was obtained.

The flow temperature of this polyester was 315° C.

Reference Example 3

A polymer was obtained in the same manner as referential example 1 except that parahydroxybenzoic acid, 4,4'-dihydroxydiphenylsulfone, terephthalic acid and isophthalic acid were charged by the molar ratio of 20:40:30:10.

After taking out the obtained polymer from the polymeization vessel and cooling, the polymer was pulverized to particles of a mean particle diameter of 1 mm or less with a grinder.

Furthermore, solid phase polymerization was conducted for 4 hours at a temperature of 220° C. under normal-pressure nitrogen atmosphere, and polyester 3 was obtained.

The flow temperature of this polyester was 315° C.

Example 1

Eighty % by weight of a liquid crystalline polyester (referred to as liquid crystalline polyester A) having the flow temperature of 360° C. and containing the repeating units A1, B1, B2 and C1 in a molar ratio of A1:B1:B2:C1=60:18:2:20, and 20% by weight of the polyester obtained in the referential example 1, were mixed with a Henschel mixer, pelletized using a twin-screw extruder (Ikegai Iron Works, Ltd. PCM-30) at the cylinder temperature of 370° C., and a thermoplastic resin composition (example 1) was obtained.

The thermoplastic resin composition was molded using an injection molding machine (Nissei Plastic Industrial Co., Ltd. PS40E5 ASE) at a cylinder temperature of 380° C., and a die temperature of 120° C., and a specimen was obtained as above.

Tensile strength, yield elongation, and flexural modulus were measured and the result is shown in Table 1.

As a result of the transmission electron microscope observation, the mean dispersion particle diameter was 0.24 micrometers, and particles having a particle diameter exceeds 1 micrometer was not observed.

TABLE 1

| Tensile strength | 1530 kg/cm$^2$ |
|---|---|
| Yield elongation | 5% |
| Flexural modulus | 56400 kg/cm$^2$ |

Examples 2 to 8

A liquid crystalline polyester (referred to as liquid crystalline polyester B) having the flow temperature of 323° C. and containing the repeating units A1, B1, B2 and C1 in a molar ratio of A1:B1:B2:C1=60:15:5:20, the polyester obtained in the referential example 2 or 3, and glass fiber (Asahi Fiber Glass Co., Ltd.) were mixed with a Henschel mixer in an amount as shown in Table 2, pelletized using a twin-screw extruder (Ikegai Iron Works, Ltd. PCM-30) at the cylinder temperature of 340° C., and thermoplastic resin compositions (example 2–8) were obtained.

The thermoplastic resin compositions were molded using an injection molding machine (Nissei Plastic Industrial Co., Ltd. PS40E5 ASE) at a cylinder temperature of 350° C., and a die temperature of 120° C., and a specimen was obtained as above.

Tensile strength, yield elongation, and flexural modulus were measured and the results are shown in Table 2.

Since the thermoplastic resin composition of the present invention is excellent in mechanical properties, it is very useful for parts of a car and an airplane, an industrial instrument, a household electric appliances product, an OA instrument, electric and electronic parts.

TABLE 2

|  | Liquid crystalline polyester (parts by weight) | Polyester 2 (parts by weight) | Polyester 3 (parts by weight) | Glass fiber (parts by weight) | Tensile strength (kg/cm$^2$) | Yield elongation (%) | Flexural modulus (kg/cm$^2$) | mean dispersion particle diameter ($\mu$m) |
|---|---|---|---|---|---|---|---|---|
| Example 2 | 80 | 20 |  |  | 1980 | 9 | 55100 | 0.39 |
| Example 3 | 80 |  | 20 |  | 2040 | 9 | 55700 | 0.32 |
| Example 4 | 20 | 80 |  |  | 910 | 5 | 44500 | 0.16 |
| Example 5 | 60 | 40 |  |  | 1740 | 7 | 61800 | 0.52 |
| Example 6 | 60 | 40 |  | 43 | 1470 | 4 | 110520 | 0.76 |
| Example 7 | 60 |  | 40 |  | 1830 | 7 | 66600 | 0.44 |
| Example 8 | 60 |  | 40 | 43 | 1430 | 4 | 115500 | 0.72 |

What is claimed is:

1. A thermoplastic resin composition comprising 60 to 99% by weight of a liquid crystalline polyester (a) and 40 to 1% by weight of a polyester (b) as indispensable components, wherein the polyester (b) is composed of the repeating units represented by the following formulas I, II and III,

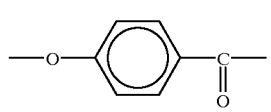

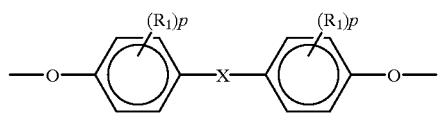

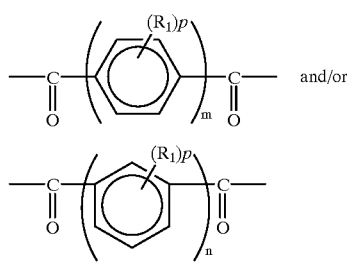

wherein X is —SO$_2$—; R$_1$ represents an alkyl group having 1 to 6 carbon atoms, an alkenyl group having 3 to 10 carbon atoms, a phenyl group, or a halogen atom; p is an integer of 0 to 4; m and n are integers of 1 to 4; a plurality of $R_1$ on the same or different nuclei may be the same or different, and each p may be the same or different, the polyester (b) has a flow temperature of 280–400° C., and satisfies the following expressions:

$$0 \leq (I) \leq 95 (\text{mol \%}) \quad (II)+(III)=100-(I) \text{ (mol \%)}$$

and $$0.9 \leq (II)/(III) \leq 1.1$$

and the polyester (a) has a combination of repeating units selected from combinations of items (1) to (7) shown below:

(1): (A1), (B1), and (C1);
(2): (A1), and (A2);
(3): a combination wherein a portion of (A1) units are replaced by (A2) in the combination of item (1);
(4): a combination wherein a portion of (B1) units are replaced by (B3) in the combination of item (1);
(5): a combination wherein a portion of (C1) units are replaced by (C3) in the combination of item (1);
(6): a combination wherein (B1) and (C2) units are further added to the combination of item (2); and
(7): (A1), a mixture of (B1) and (B2), and (C1), wherein the repeating units are represented by the following formulas:

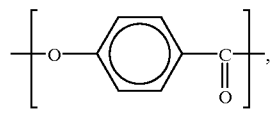 (A1)

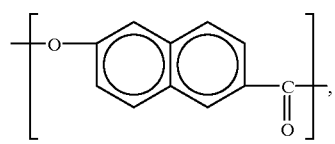 (A2)

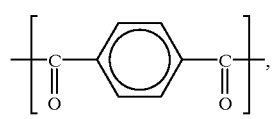 (B1)

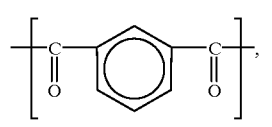 (B2)

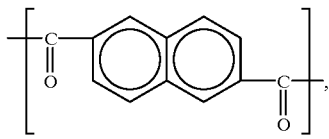 (B3)

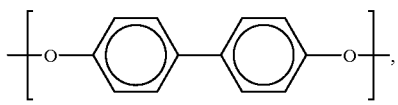 (C1)

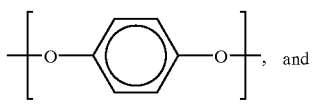 (C2)

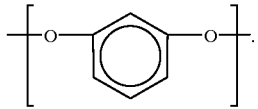 (C3)

2. The thermoplastic resin composition according to claim 1, wherein the liquid crystalline polyester (a) contains a repeating unit represented by the following formula (A1) in an amount of at least 30 mol %,

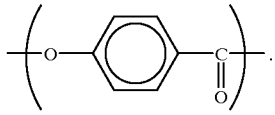 (A1)

3. A molded article molded from the thermoplastic resin composition of claim 1.

4. The molded article according to claim 3, wherein the component (b) is finely dispersed with a mean dispersion particle diameter of 1 micrometer or less in the molded article.

* * * * *